(12) United States Patent
Saxena et al.

(10) Patent No.: US 10,830,408 B1
(45) Date of Patent: Nov. 10, 2020

(54) LIGHTING DEVICES WITH VARIABLE BEAM PATTERNS

(71) Applicant: HONEYWELL INTERNATIONAL INC., Morris Plains, NJ (US)

(72) Inventors: Sunit Kumar Saxena, Bangalore (IN); Anita Sure, Bangalore (IN); Gowtham Kumar Vankayala, Bangalore (IN); Newel Stephens, Springfield, OH (US); Craig Giffen, Hilliard, OH (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/504,106

(22) Filed: Jul. 5, 2019

(51) Int. Cl.
| | |
|---|---|
| *F21S 41/65* | (2018.01) |
| *F21S 41/20* | (2018.01) |
| *F21S 41/148* | (2018.01) |
| *F21S 41/32* | (2018.01) |
| *B64D 47/06* | (2006.01) |

(Continued)

(52) U.S. Cl.
CPC .............. *F21S 41/65* (2018.01); *B64D 47/04* (2013.01); *B64D 47/06* (2013.01); *F21S 41/148* (2018.01); *F21S 41/285* (2018.01); *F21S 41/323* (2018.01); *H05B 45/10* (2020.01); *B64D 2203/00* (2013.01); *F21Y 2115/10* (2016.08)

(58) Field of Classification Search
CPC ........ F21S 41/65; F21S 41/323; F21S 41/285; F21S 41/148; H05B 45/10; B64D 47/06; B64D 47/04; B64D 2203/00; F21Y 2115/10

USPC .......................................................... 315/77
See application file for complete search history.

(56) References Cited

U.S. PATENT DOCUMENTS

| 4,729,077 A | 3/1988 | Gordin et al. |
| 7,731,402 B2 | 6/2010 | Tessnow et al. |

(Continued)

FOREIGN PATENT DOCUMENTS

| DE | 102012201494 A1 | 8/2012 |
| WO | 2018073196 A1 | 4/2018 |
| WO | 2018149935 A1 | 8/2018 |

*Primary Examiner* — Don P Le
(74) *Attorney, Agent, or Firm* — Lorenz & Kopf, LLP

(57) ABSTRACT

A lighting device including a plurality of light-emitting semiconductor devices. The light-emitting semiconductor devices are separated into at least two subgroups. The lighting device further includes a plurality of optics separated into at least two subgroups, which are arranged relative to the plurality of light-emitting semiconductor devices such that each one of the plurality of light-emitting semiconductor devices of a first subgroup is located at a focal point of a respective optic of a first subgroup of the plurality of optics, and such that each one of the plurality of light-emitting semiconductor devices of a second subgroup is located at a focal point of a respective optic of a second subgroup of the plurality of optics. The optical properties of the first subgroup and second subgroup of the plurality of optics are different. The lighting device further includes a controller module configured to control at least two current signals supplied from a power source to each of the at least two subgroups of light-emitting semiconductor devices, respectively. The controller module is configured to modify the beam width and the peak intensity of the emitted beam of light by varying the magnitude of the respective at least two current signals.

20 Claims, 15 Drawing Sheets

(51) Int. Cl.
*B64D 47/04* (2006.01)
*H05B 45/10* (2020.01)
*F21Y 115/10* (2016.01)

(56) References Cited

U.S. PATENT DOCUMENTS

| | | | |
|---|---|---|---|
| 10,189,579 | B2 | 1/2019 | Hessling-von Heimendahl |
| 2013/0169154 | A1* | 7/2013 | Kay ............... B60Q 1/143 |
| | | | 315/81 |
| 2013/0249375 | A1* | 9/2013 | Panagotacos ........... F21V 23/06 |
| | | | 313/13 |
| 2014/0084809 | A1 | 3/2014 | Catalano |
| 2015/0146442 | A1 | 5/2015 | Bonnefous et al. |
| 2017/0275021 | A1 | 9/2017 | Tsao |
| 2018/0033426 | A1 | 1/2018 | Kapralova et al. |
| 2018/0172242 | A1 | 6/2018 | Stopa et al. |
| 2019/0032879 | A1 | 1/2019 | Tsao |

* cited by examiner

LIGHTING DEVICES WITH VARIABLE BEAM PATTERNS

TECHNICAL FIELD

The present disclosure generally relates to lighting devices for vehicles, and more specifically relates to lighting devices for aircraft.

BACKGROUND

Vehicle lighting devices, such as lighting devices for aircraft, are known. Lighting devices are generally required on aircraft for use as landing lights, taxi lights, search lights, and so on. These lighting devices are used, for example, to better illuminate a runway during take-off and landing procedures in low-light conditions, to indicate an aircraft's position in an aerodrome to other aircraft, or to illuminate objects.

Typically, vehicles include different types of lighting devices for different applications. For example, an aircraft may include a taxi light; a landing light; one or more runway lights; one or more service illumination lights; one or more wing illumination lights; a logo light; and one or more courtesy lights for various different lighting applications. Some of these different types of lights may even be included at the same location on the aircraft and differ only in the different beam patterns or spreads produced by the different lighting devices. For example, a taxi light typically requires a light beam spread of about 40°×9°, a runway turnoff light typically requires a beam spread of about 50°×10°, a cargo service illumination light typically requires a beam spread of about 80°×20°, wing illumination lights typically require a beam spread of about 13°×11°, and so on.

It is desirable to reduce the need to include multiple different types of lighting devices on a vehicle. More specifically, it would be desirable to have a single lighting device that is able to produce different beam patterns with different beam spreads so as to be suitable for various different lighting applications.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

In an embodiment, there is provided a lighting device for a vehicle, the lighting device includes a plurality of light-emitting semiconductor devices. The plurality of light-emitting semiconductor devices are configured to together emit a beam of light having a beam width and a peak intensity. The plurality of light-emitting semiconductor devices are separated into at least two subgroups. The lighting device further includes a plurality of optics. The plurality of optics are separated into at least two subgroups, and are arranged relative to the plurality of light-emitting semiconductor devices such that each one of the plurality of light-emitting semiconductor devices of a first subgroup of the at least two subgroups is located at a focal point of a respective optic of a first subgroup of the plurality of optics, and such that each one of the plurality of light-emitting semiconductor devices of a second subgroup of the at least two subgroups is located at a focal point of a respective optic of a second subgroup of the plurality of optics. The optical properties of the first subgroup of the plurality of optics are different to the optical properties of the second subgroup of the plurality of optics. The lighting device further includes a controller module configured to control at least two current signals supplied from a power source to each of the at least two subgroups of light-emitting semiconductor devices, respectively, wherein the controller module is configured to modify the beam width and the peak intensity of the emitted beam of light by varying the magnitude of the respective at least two current signals supplied to each of the at least two subgroups of light-emitting semiconductor devices.

In an embodiment, there is provided a vehicle comprising a lighting device, the lighting device comprising a plurality of light-emitting semiconductor devices. The plurality of light-emitting semiconductor devices are configured to together emit a beam of light having a beam width and a peak intensity. The plurality of light-emitting semiconductor devices are separated into at least two subgroups. The lighting device further includes a plurality of optics. The plurality of optics are separated into at least two subgroups, and are arranged relative to the plurality of light-emitting semiconductor devices such that each one of the plurality of light-emitting semiconductor devices of a first subgroup of the at least two subgroups is located at a focal point of a respective optic of a first subgroup of the plurality of optics, and such that each one of the plurality of light-emitting semiconductor devices of a second subgroup of the at least two subgroups is located at a focal point of a respective optic of a second subgroup of the plurality of optics. The optical properties of the first subgroup of the plurality of optics are different to the optical properties of the second subgroup of the plurality of optics. The lighting device further includes a controller module configured to control at least two current signals supplied from a power source to each of the at least two subgroups of light-emitting semiconductor devices, respectively, wherein the controller module is configured to modify the beam width and the peak intensity of the emitted beam of light by varying the magnitude of the respective at least two current signals supplied to each of the at least two subgroups of light-emitting semiconductor devices.

In an embodiment, there is provided a lighting device for a vehicle. The lighting device includes a plurality of light-emitting semiconductor devices, the plurality of light-emitting semiconductor devices comprising at least one multiple-LED die and being configured to together emit a beam of light having a beam width and a peak intensity, wherein the plurality of light-emitting semiconductor devices are separated into at least two subgroups. The lighting device also include a plurality of optics, wherein each LED of the at least one multiple-LED die is associated with a respective parabolic reflector, each parabolic reflector being arranged relative to each LED of the at least one multiple-LED die such that the peak intensity of the beam of emitted light from each LED is perpendicular to an axis of the respective parabolic reflector, and wherein each LED is located at a focal point of each respective parabolic reflector. The lighting device also includes a controller module configured to control at least two current signals supplied from a power source to each of the at least two subgroups of light-emitting semiconductor devices, respectively, wherein the controller module is configured to modify the beam width and the peak intensity of the emitted beam of light by varying the magnitude of the respective at least two current signals supplied to each of the at least two subgroups of light-emitting semiconductor devices.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. Furthermore, there is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
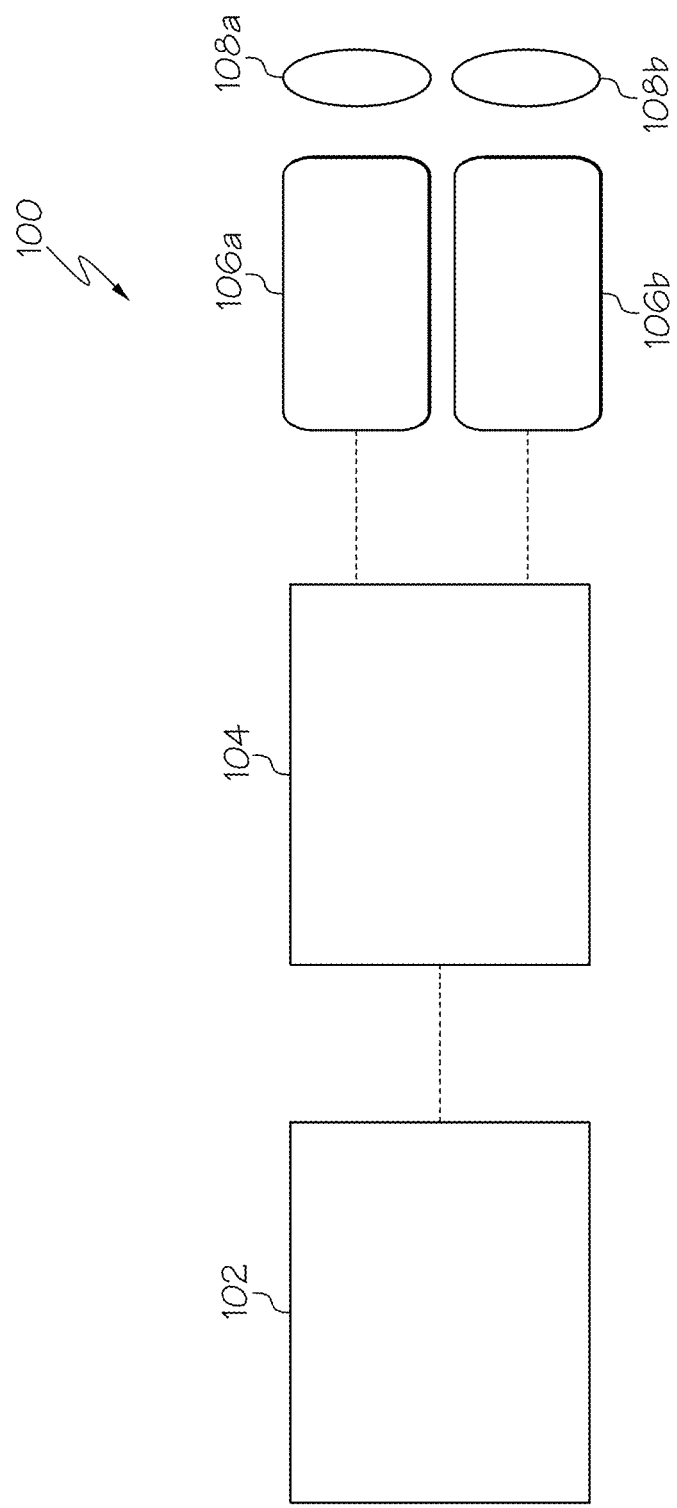
FIG. 1 shows a schematic of a lighting device in accordance with exemplary embodiments.

With reference to FIG. 1, a schematic of a lighting device 100 for a vehicle, for example an aircraft, is shown. The lighting device 100 may include a power source 102 for supplying electrical energy to other components of the lighting device 100. Alternatively, the power source may be external to the lighting device 100. A controller module 104 is operably connected to the power source 102. A first subgroup of light-emitting semiconductor devices 106a and a second subgroup of light-emitting semiconductor devices 106b are operably connected to the controller module 104. In various exemplary embodiments, further subgroups of light-emitting semiconductor devices are operably connected to the controller module 104. The controller module 104 is configured to independently control the amount of electrical energy supplied to each subgroup 106a, 106b of light-emitting semiconductor devices in a manner that will be described in more detail below.

A first subgroup of optics 108a is arranged proximate to the first subgroup of light-emitting semiconductor devices 106a. Similarly, a second subgroup of optics 108b is arranged proximate to the second subgroup of light-emitting semiconductor devices 106b. Each of the first and second subgroups of optics 108a, 108b are arranged with respect to the first and second subgroups of light-emitting semiconductor devices 106a, 106b such that each one of the light-emitting semiconductor devices is positioned at a focal point of a respective optic. In other words, each one of the light-emitting semiconductors devices of the first subgroup of light-emitting semiconductor devices 106a is positioned at a focal point of an optic of the first subgroup of optics 108a, and each one of the light-emitting semiconductors devices of the second subgroup of light-emitting semiconductor devices 106b is positioned at a focal point of an optic of the second subgroup of optics 108b. The optical properties of optics of the first subgroup of optics 108a are different from the optical properties of the optics of the second subgroup of optics 108b, for reasons that will be explained in more detail below.

By fixedly positioning each light-emitting semiconductor device at a focal point of a respective optic, several advantages are achieved. Firstly, if a light-emitting semiconductor device is not positioned at the focal point of each optic, the light emitted by the light-emitting semiconductor device may be altered by the optic in a non-uniform manner. This non-uniform altering of the emitted light may cause a reduction in the overall amount of illumination achieved by the light-emitting semiconductor device. Conversely, by positioning the light-emitting semiconductor device at the focal point of the optic, the emitted light may be altered in a more uniform manner, thereby reducing this potential loss in illumination. Secondly, positioning the light-emitting semiconductor device at the focal point of the optic allows for the collection efficiency of the optic to be maximized, because a minimal amount of emitted light is lost by refraction or reflection off surfaces of the optic. Thirdly, by including an individual optic for each individual light-emitting semiconductor device instead of including an optic that covers multiple light-emitting semiconductor devices, the above advantages can be achieved for each one of the light-emitting semiconductor devices. Fourthly, by including a separate optic for each individual light-emitting semiconductor device, the overall size of the lighting device can be reduced, as each optic can be kept small in size as compared to an device that includes a larger optic that covers multiple light-emitting semiconductor devices.

However, by positioning each light-emitting semiconductor device at a focal point of each optic, one manner of altering the shape and spread of the beam of light emitted by the semiconductor device, namely by varying the position of the light-emitting device with respect to the optic, is no longer possible. In particular, varying the position of the light-emitting device with respect to the optic may move the light-emitting device away from the focal point of the optic. As explained above, one object of the present disclosure is to provide a lighting device that is able to produce multiple different types of beam having different beam spreads. As such, another technique of producing different types of overall beam with different beam spreads is required that is suitable for light-emitting semiconductor devices being fixedly positioned with respect to the optics.

The lighting device 100 is configured to produce different types of beam patterns with different beam spreads by varying the amount of electrical energy, for example the current, supplied to each subgroup 106a, 106b of light-emitting semiconductor devices. In this manner, the different light beams produced by the first and second subgroups of light-emitting devices and optics can be varied as desired so as to vary the beam pattern of the overall composite beam emitted by the lighting device 100, which composite beam is the result of the combination of the individual light beams produced by the first and second subgroups of light-emitting devices.

Figure 2:
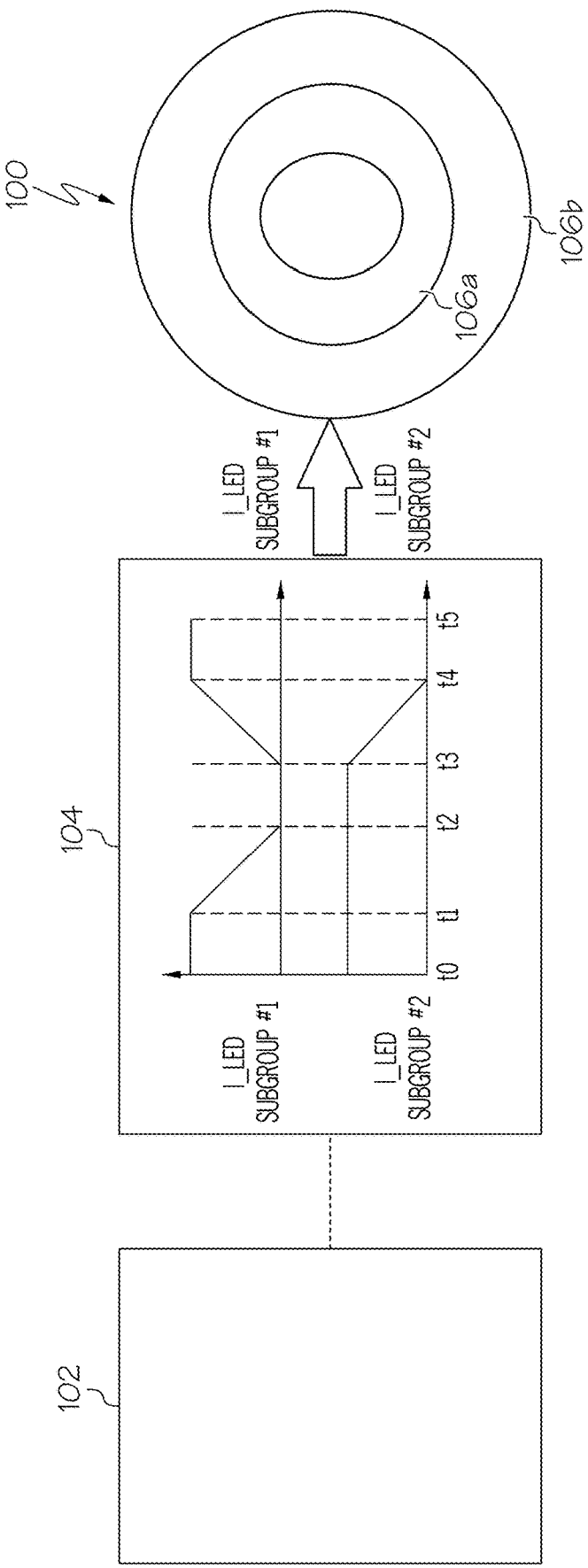
FIG. 2 shows another schematic of a lighting device in accordance with exemplary embodiments.

The manner in which the overall composite beam emitted by the lighting device 100 may be varied is explained with respect to FIG. 2. As shown in FIG. 2, the lighting device 100 includes an area (exemplified in this figure as an inner radial ring) including the first subgroup of light-emitting semiconductor devices 106a and an area (exemplified in this figure as an outer radial ring) including the second subgroup of light-emitting semiconductor devices 106b. Although the positions of the first and second subgroups of light-emitting semiconductor devices shown in this figure are exemplified by inner and outer radial rings, it will be appreciated that many different configurations and positions for the different subgroups of light-emitting semiconductor devices are possible.

The controller module 104 is configured to vary the current supplied to each light-emitting semiconductor device subgroup. In the example of FIG. 2, the controller module 104 is configured to supply an equal amount of current from the power source 102 to each subgroup of light-emitting semiconductor devices from time t0 to time t1. The resultant composite overall beam pattern generated by the light emitted from both subgroups therefore has a first configuration from time t0 to time t1, with a first beam spread and a first peak intensity. From time t1 to time t2, the controller module 104 decreases the current supplied to the first subgroup of light-emitting semiconductor devices and maintains the amount of current supplied to the second subgroup of light-emitting semiconductor devices. Due to the different optical properties of the first subgroup of optics 108a associated with the first subgroup of light-emitting semiconductor devices 106a as compared to the second subgroup of optics 108b associated with the second subgroup of light-emitting semiconductor devices 106b, the shape of the overall composite beam emitted by the lighting device will also vary over this time period t1 to t2. For example, if the first subgroup of optics 108a and associated light-emitting semiconductor devices 106a are configured to produce a narrower beam spread as compared to the second subgroup of optics 108b and the associated second subgroup of light-emitting semiconductor devices 106b, as the amount of current supplied to the first subgroup of light-emitting semiconductor devices 106a decreases the composite overall beam spread will increase. At time t2, the controller module supplies no current to the first subgroup of light-emitting semiconductor devices 106a. As such, at time t2 to t3, the composite beam emitted by the lighting device 100 corresponds solely to the individual beam produced by the second subgroup of light-emitting semiconductor devices 106b and optics 108b, with no contribution to this overall composite beam from the first subgroup of light-emitting semiconductor devices 106a.

At time t3, the controller module 104 begins decreasing the amount of current supplied to the second subgroup of light-emitting semiconductor devices 106b and simultaneously increasing the amount of current supplied to the first subgroup of light-emitting semiconductor devices 106a. As such, from time t3 to time t4, the shape of the composite overall beam emitted by the lighting device 100 varies. In particular, if the first subgroup of optics 108a and associated light-emitting semiconductor devices 106a are configured to produce a narrower beam spread as compared to the second subgroup of optics 108b and associated second subgroup of light-emitting semiconductor devices 106a, as the amount of current supplied to the first subgroup of light-emitting semiconductor devices 106a increases and the amount of current supplied to the second subgroup of light-emitting semiconductor devices 106b decreases, the composite overall beam spread will decrease. In other words, the contribution to the overall composite beam will trend towards the individual beam produced by the first subgroup of light-emitting semiconductor devices 106a and associated optics 108a as the current to the first subgroup of light-emitting semiconductor devices increases and the current supplied to the second subgroup of light-emitting semiconductor devices decreases.

At time t4, the controller module 104 supplies no current to the second subgroup of light-emitting semiconductor devices 106b and supplies a non-zero amount of current to the first subgroup of light-emitting semiconductor devices 106a. As such, at time t4 to time t5, the properties of the composite beam emitted by the lighting device are defined solely by the properties of the first subgroup of light-emitting semiconductor devices 106a and first subgroup of optics 108a.

As can be seen from FIG. 2, by varying the current supplied to each subgroup of light-emitting semiconductor devices over a range of discrete values (for example over three or more discrete values) in a quasi-continuous manner, a greater range of potential composite beam patterns can be achieved as compared to a hypothetical system where each subgroup of light-emitting semiconductor devices is simply switched "on" or "off", i.e., between a zero and non-zero current value.

Additional information as to how the composite beam emitted by the lighting device 100 can be varied as a result of the variation in current supplied to each subgroup of light-emitting semiconductor devices can be seen in FIG. 3 when read in conjunction with Table 1 below.

TABLE 1

| | Current supplied to second subgroup of light emitting semiconductor devices | Current supplied to first subgroup of light emitting semiconductor devices | Composite Beam Width @ 10% | Composite Beam Peak Intensity (cd) |
| --- | --- | --- | --- | --- |
| Option 1 | 1.5 A | 0 A | 14.5° | 187,992 |
| Option 2 | 1.25 A | 0.25 | 15° | 171,392 |

TABLE 1-continued

| | Current supplied to second subgroup of light emitting semiconductor devices | Current supplied to first subgroup of light emitting semiconductor devices | Composite Beam Width @ 10% | Composite Beam Peak Intensity (cd) |
|---|---|---|---|---|
| Option 3 | 1 A | 0.5 A | 17° | 154,113 |
| Option 4 | 1.5 A | 1.5 A | 20° | 211,982 |
| Option 5 | 0.75 A | 0.75 A | 21° | 128,937 |
| Option 6 | 0.5 A | 1 A | 23° | 102,123 |
| Option 7 | 0.25 A | 1.25 A | 31° | 65,721 |
| Option 8 | 0 A | 1.5 A | 38° | 23,990 |

Figure 3:
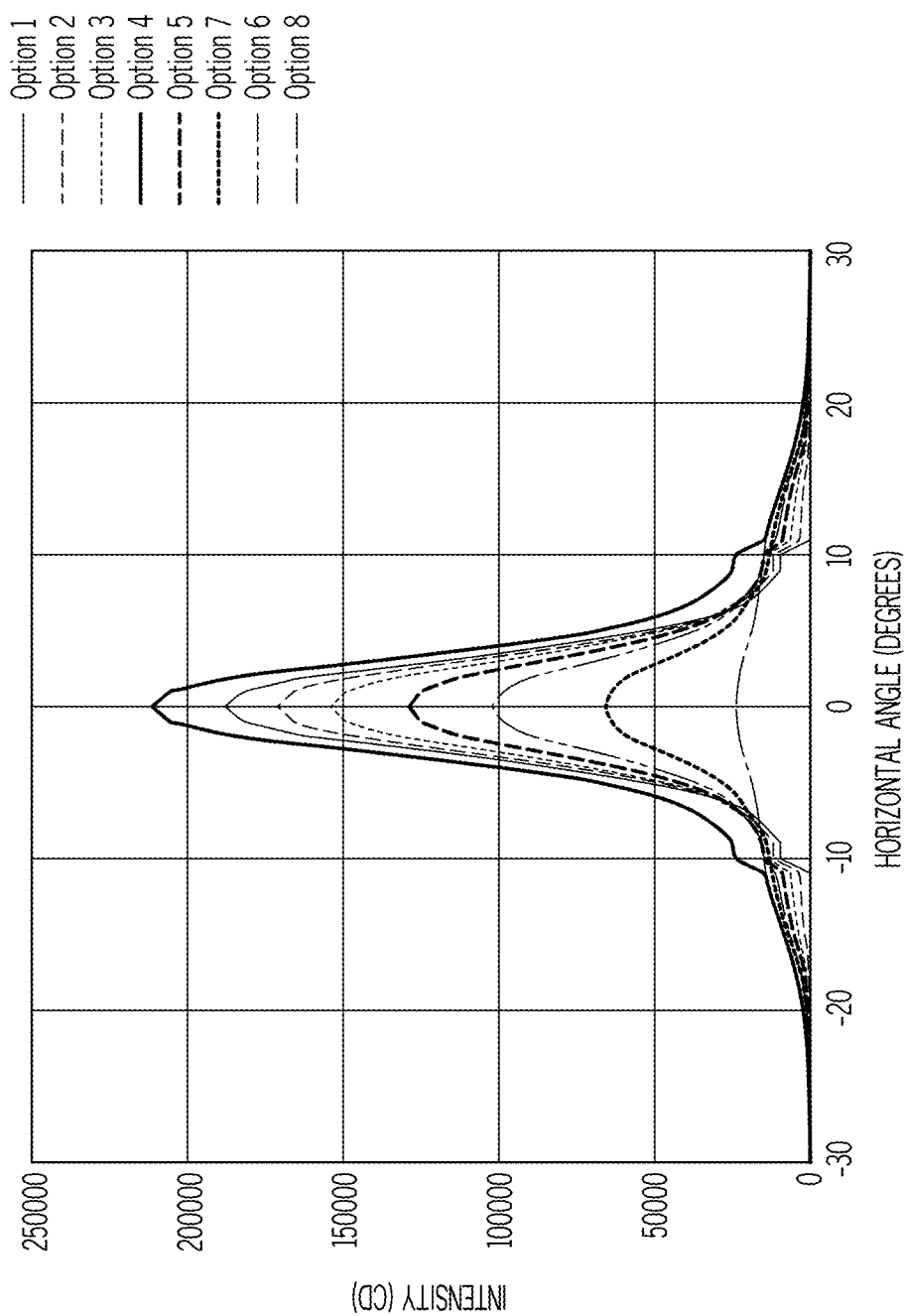
FIG. 3 shows a graph illustrating a change in beam spread and peak intensity.

As can be seen in FIG. 3, various illustrative options are shown, these options corresponding to composite beams having different beam spreads and peak intensities, all of which may be output by the lighting device 100 by varying the amount of current supplied to the first and second subgroups of light-emitting semiconductor devices 106a, 106b. The various currents supplied to the first and second subgroups of light-emitting semiconductor devices 106a, 106b to produce these different types of composite beam pattern are shown in Table 1. As can be appreciated, the adaptability of the lighting device to produce different types of composite beam pattern is increased with the lighting device according to exemplary embodiments. As can be further appreciated, further beam configurations are possible depending on the resolution and range of the controller module 104.

In exemplary embodiments, each subgroup of light-emitting semiconductor devices 106a, 106b corresponds to a group of LEDs, for example a multi-die LED. In alternative exemplary embodiments, each subgroup of light-emitting semiconductor devices corresponds to a single LED.

Figure 4:
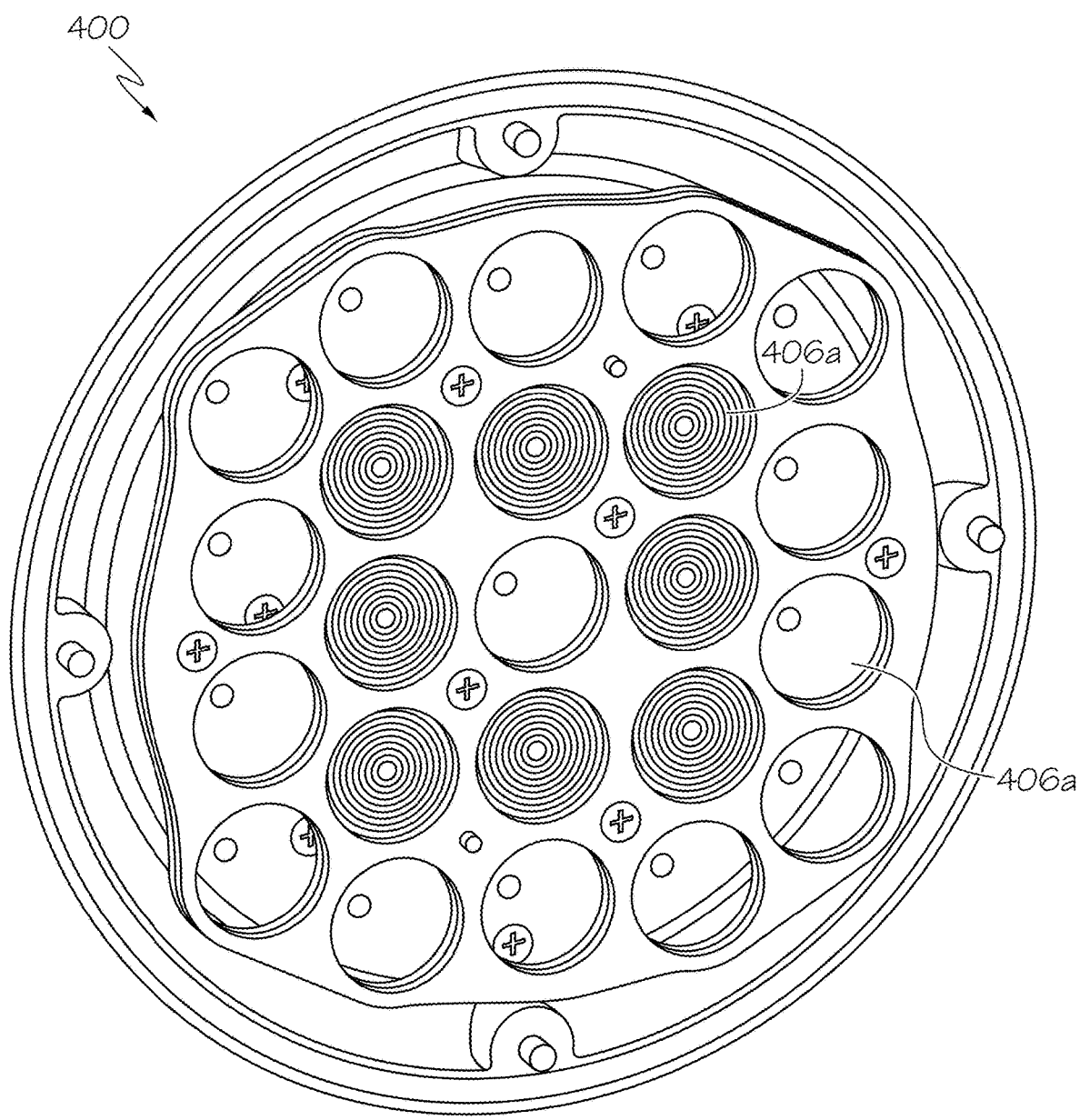
FIG. 4 shows a lighting device in accordance with exemplary embodiments.
Figure 5:
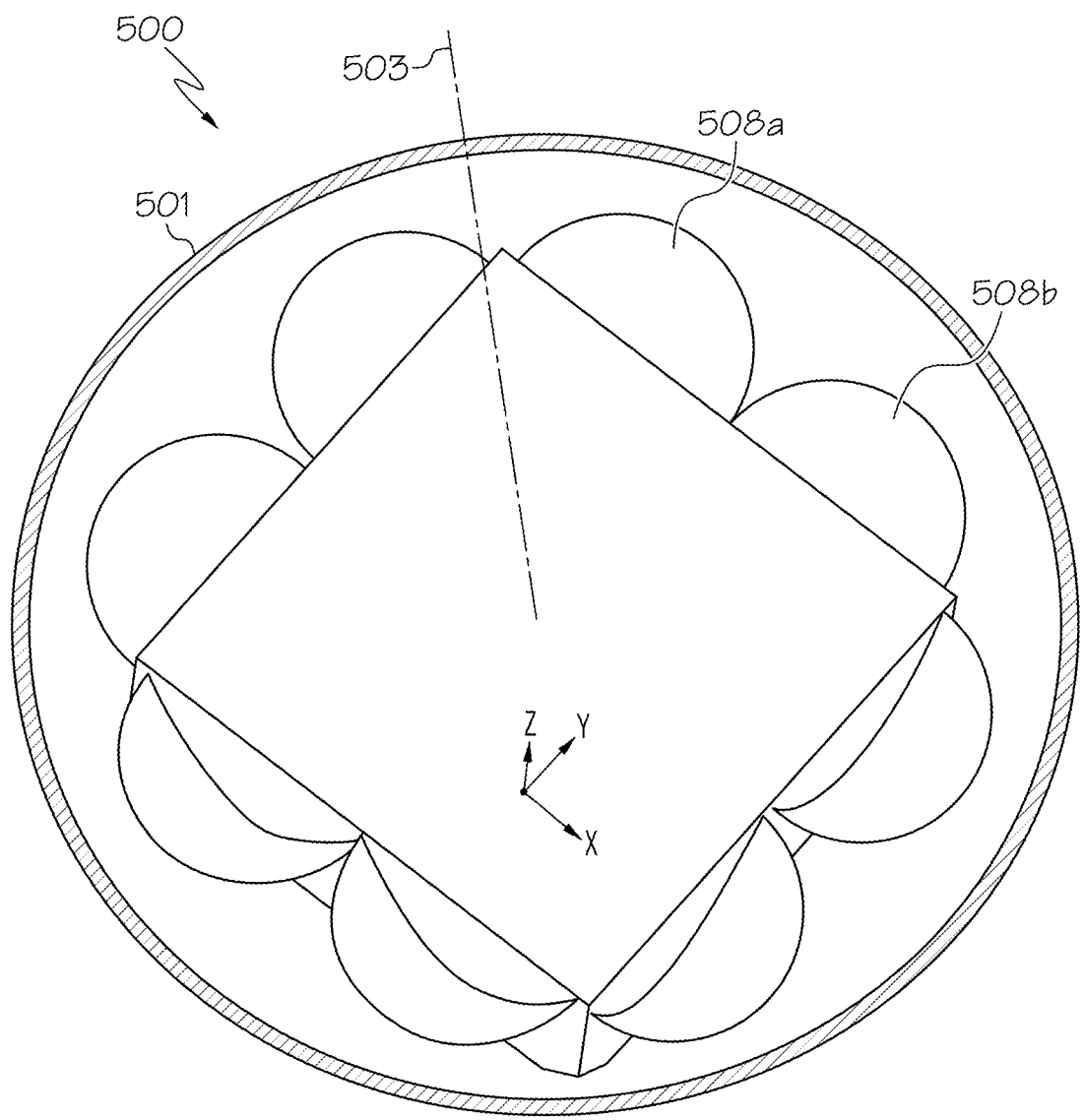
FIG. 5 shows another lighting device in accordance with exemplary embodiments.

In exemplary embodiments, the optics forming part of the first and second subgroups of optics may be lenses, for example a total internal reflection (TIR) lens. An exemplary lighting device 400 including lenses is shown in FIG. 4. As can be seen in FIG. 4, the lighting device 400 includes first and second subgroups of lenses 406a, 406b disposed over the first and second subgroups of light-emitting semiconductor devices, respectively. The first subgroup of lenses 406a have different optical properties to the second subgroup of lenses 406b.

In an embodiment, the lenses of the first and/or second subgroups are transparent and uncoated. In another embodiment, the lenses are transparent and coated with a lens coating, such as an anti-reflective, anti-fog and/or scratch resistant coating, or another type of coating. In yet another embodiment, the lenses are translucent and/or partially or wholly opaque to certain wavelengths of light. The lens coating and/or lenses 406a, 406b may be adapted to the intended function of the lighting device 400.

In alternative exemplary embodiments, the optics forming part of the first and second subgroups of optics may be reflectors. An exemplary lighting device 500 having reflectors 508a, 508b as the optics associated with the first and second subgroups of light-emitting semiconductor devices. The lighting device 500 comprises a housing 501 surrounding the light-emitting semiconductor devices and the reflectors 508a, 508b. The housing 503 includes a central axis 503. In the lighting device 500, it is noted that the first and second subgroups of light-emitting semiconductor devices are mounted laterally, such that the peak light emission direction of each light-emitting semiconductor device is perpendicular to the central axis 503 of the lighting device 500.

Figure 6:
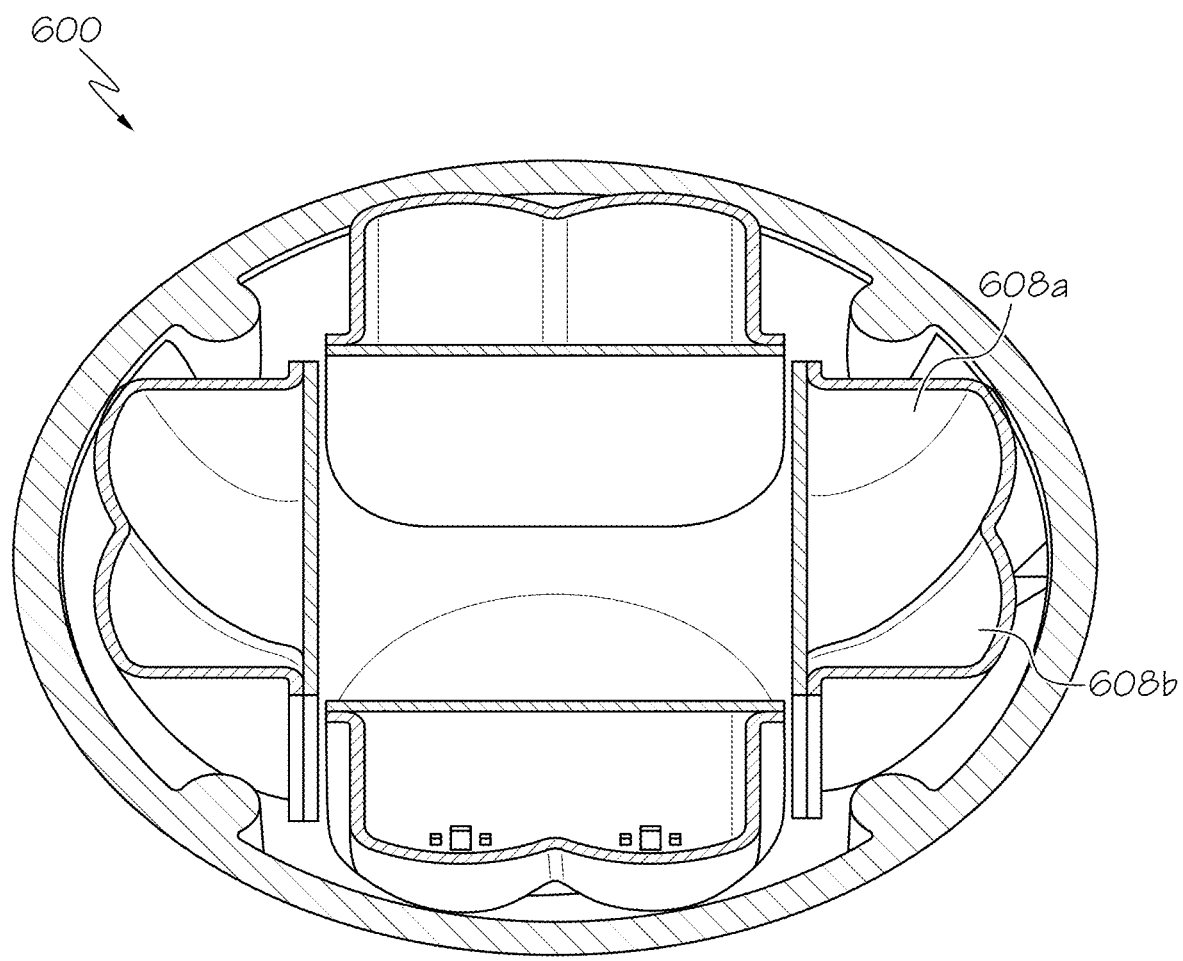
FIG. 6 shows another lighting device in accordance with exemplary embodiments.
Figure 7:
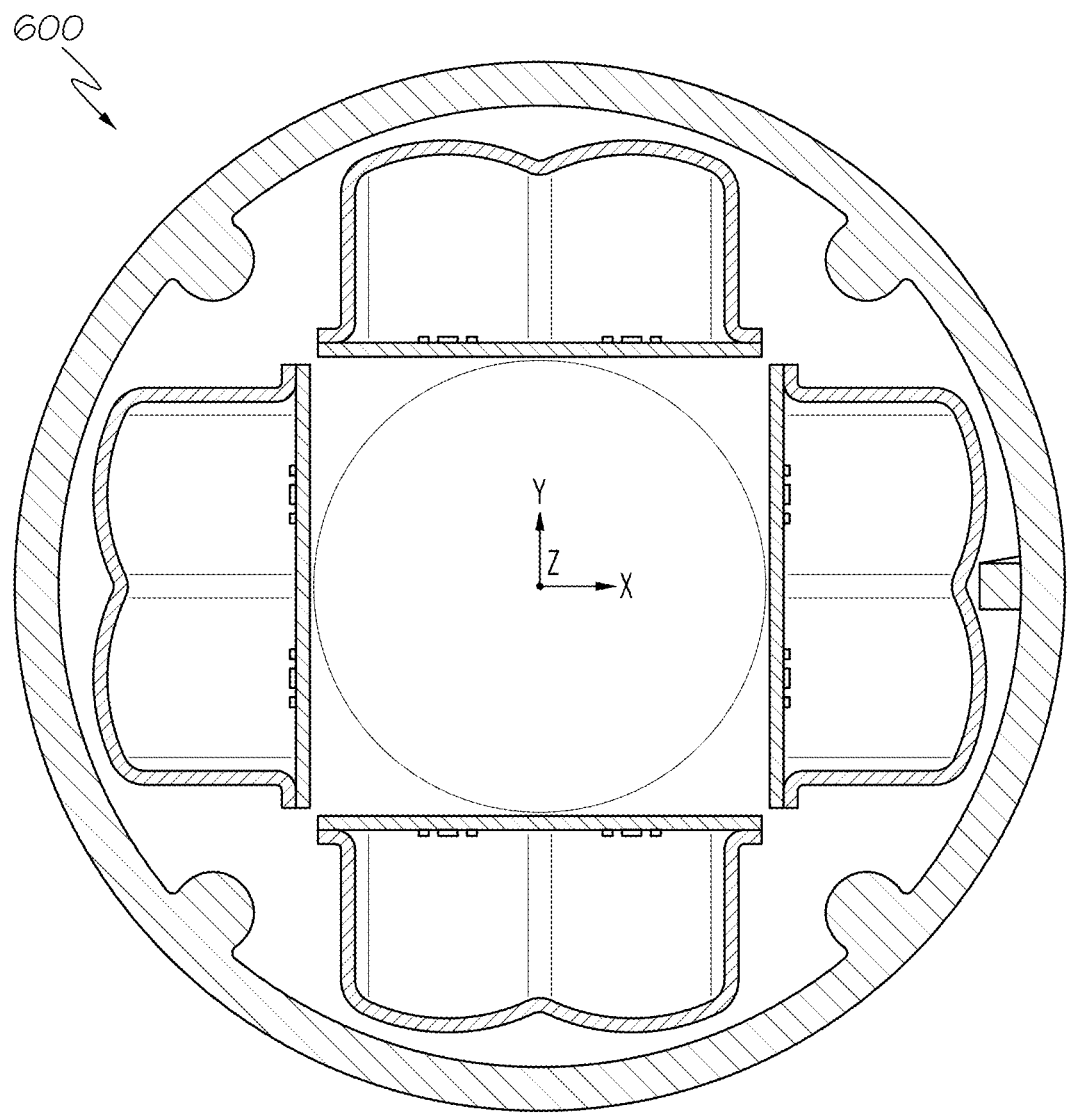
FIG. 7 shows another view of the lighting device shown in FIG. 6.

Another a lighting device 600 having reflectors is shown in FIG. 6. As can be seen in FIG. 6, the shape and positions of the different subgroups of reflectors 608a, 608b may vary depending on the desired functionality of the lighting device 500. A top view of the lighting device 600 is shown in FIG. 7.

Figure 8:
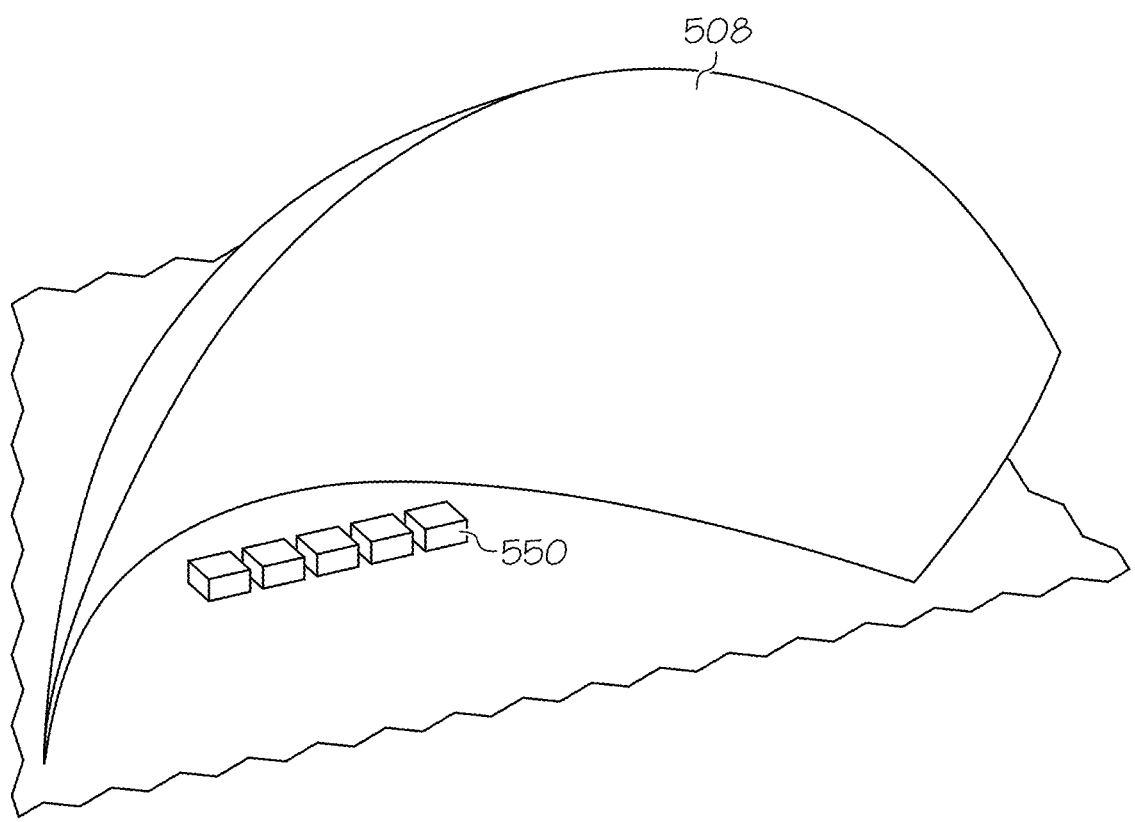
FIG. 8 shows a view of a multi-die LED incorporated into a lighting device in accordance with exemplary embodiments.

The lighting devices 500, 600 may include two or more multiple die LEDs as the first and second subgroups of light-emitting semiconductor devices. One example of a multiple die LED is a 5-die LED 550, shown in FIG. 8. As can be seen in FIG. 8, a 5-die LED 550 includes 5 LEDs arranged proximate to one another, wherein the current supplied to each LED of the 5-die LED 550 can be varied independently by the controller module so as to independently vary the luminosity of each LED. Each LED is associated with an optic 508, for example a respective small lens or reflector, or a reflector that is shaped so as to form a series of respective optics for each LED. In an exemplary embodiment not shown in FIG. 8, the optic 508 is shaped so as to correspond to a series of parabolic reflectors, with each LED of the multiple-die LED being located at a focal point of a respective one of the parabolic reflectors such that the peak emitted light intensity direction of each LED is perpendicular to an axis of each respective parabolic reflector. Such an arrangement allows for improved optical efficiency.

Figure 9A:
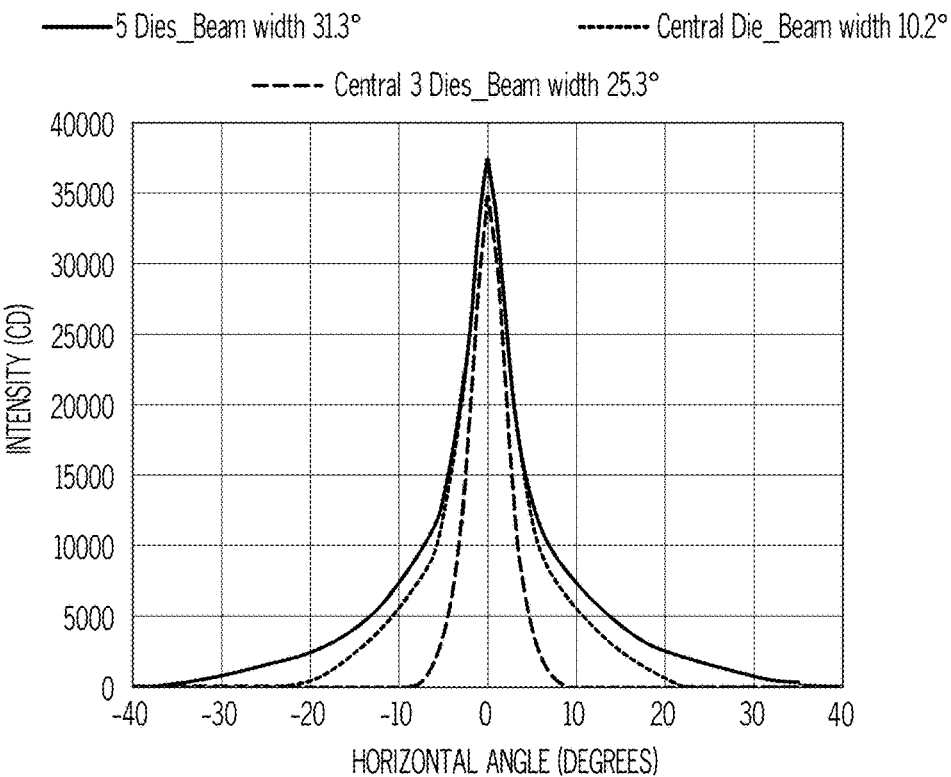
FIGS. 9A and 9B show graphs illustrating a change in beam spread and peak intensity.
Figure 9B:
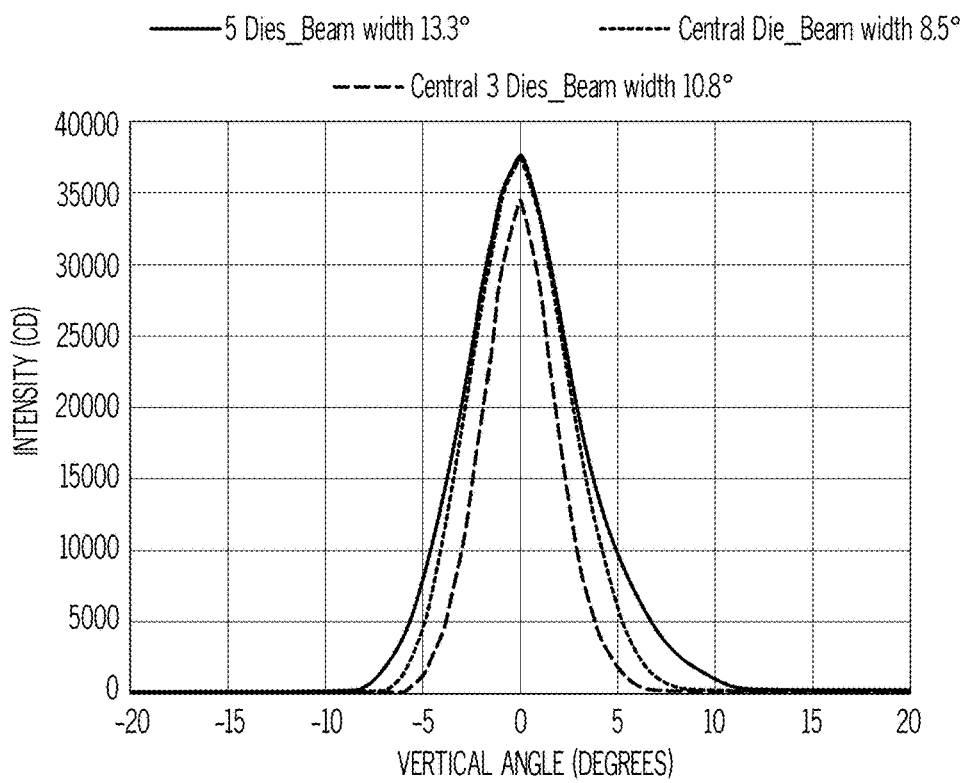

The effects of varying the current supplied to various LEDs of the 5-die LED are shown in FIGS. 9A and 9B in conjunction with Table 2 shown below.

TABLE 2

| | | Beam Width @ 10% | | Peak |
|---|---|---|---|---|
| | Current | Horizontal | Vertical | Intensity (cd) |
| All 5 LEDs | 1 A | 31.3° | 13.3° | 37,679 |
| Central 3 LEDs | 1 A | 25.3° | 10.8° | 37,609 |
| Central LED | 1 A | 10.2° | 8.5° | 34,767 |

As can be seen in FIGS. 9A and 9B, by illuminating all 5 LEDs of the 5-die LED, the central 3 LEDs of the 5-die LED or the central LED of the 5-die LED, different overall beam patterns result, with different beam widths and different peak intensities. The horizontal and vertical scans of the overall beam patterns are shown in FIG. 7, and show an increasing beam spread as current is supplied to more of the LEDs of the 5-die LED. Although FIGS. 9A and 9B show the variation of the current being supplied to each LED of the 5-die LED being of an ON/OFF form, it will be appreciated that an even greater range of beam spreads can be achieved by varying the current supplied to the LEDS of the 5-die LED over three or more discrete values (for example, supplying 1.5 A to the central LED, 1 A to the LEDs either side of the central LED, and 0.5 A to the outermost LEDs).

Figure 10:
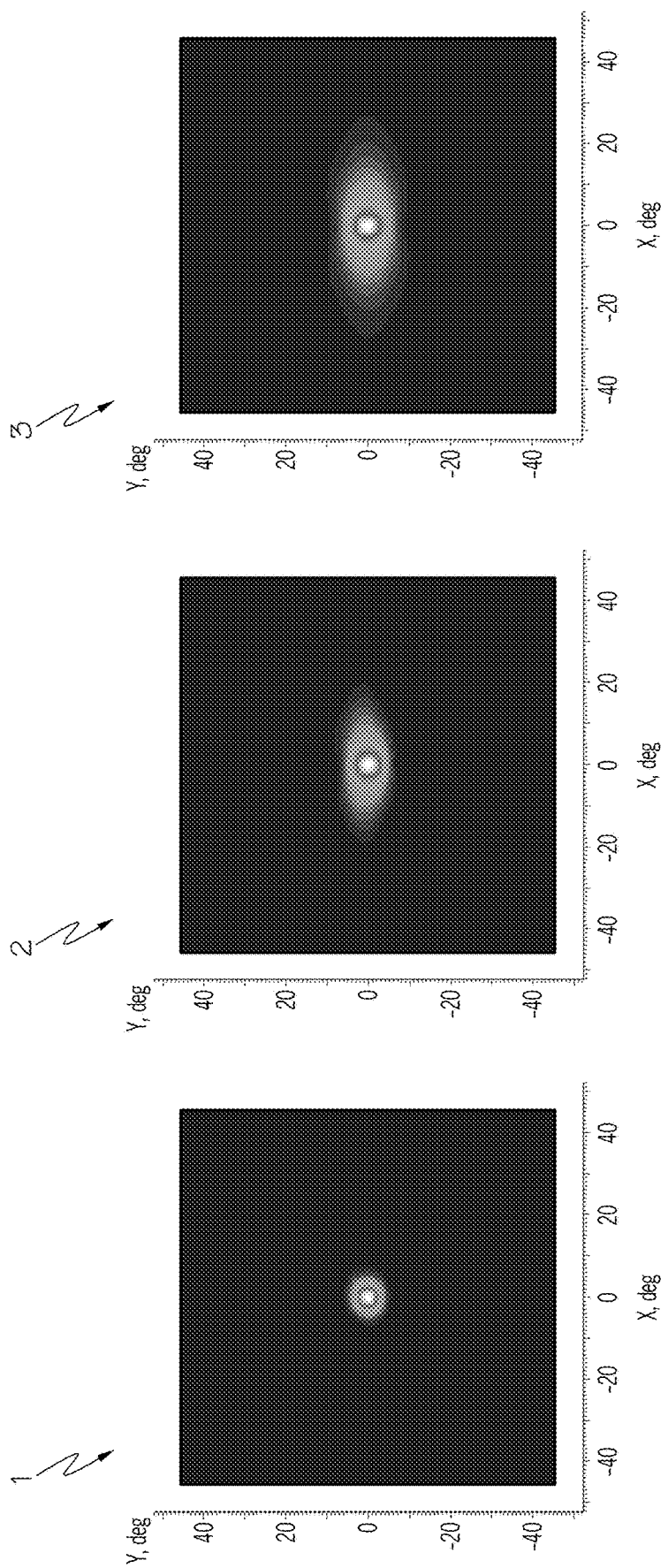
FIG. 10 shows images illustrating a variation in beam spread.

FIG. 10 shows intensity plots for the three situations given in Table 2. The left-most plot 1 of FIG. 10 shows the light intensity distribution of the overall beam from the lighting device when only the central LED is supplied with current, the central plot 2 of FIG. 10 shows the light intensity distribution when the central three LEDs are supplied with current, and the right-most plot 3 of FIG. 10 shows the light intensity distribution when all five LEDs are supplied with current. As can be seen in FIG. 10, as more LEDs of the 5-die LED are illuminated, the spread of the emitted composite beam increases.

Figure 11A:
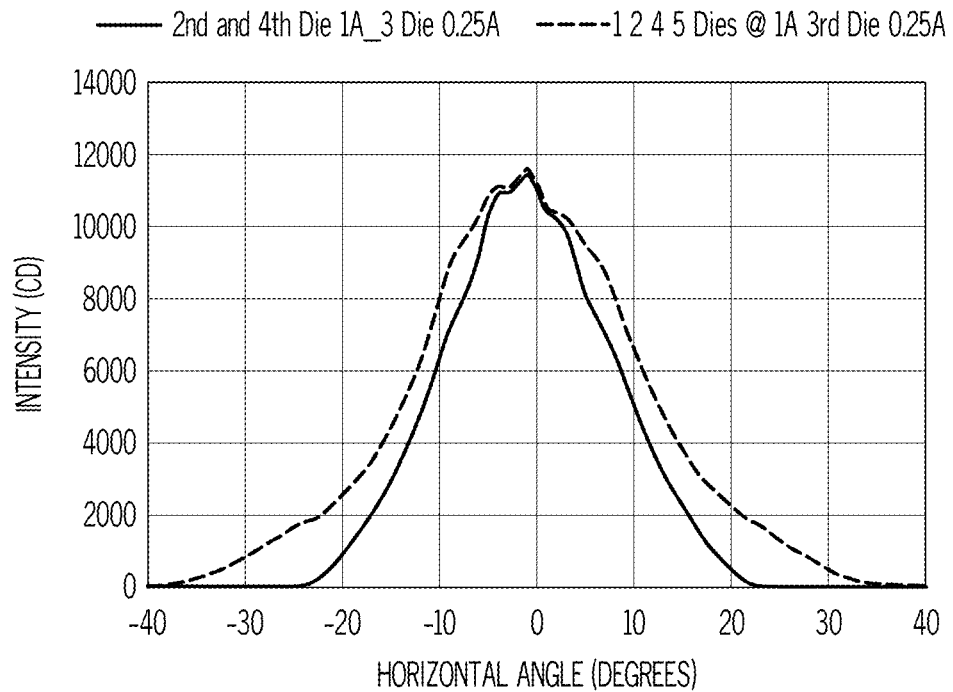
FIGS. 11A and 11B show graphs illustrating a change in beam spread and peak intensity.
Figure 11B:
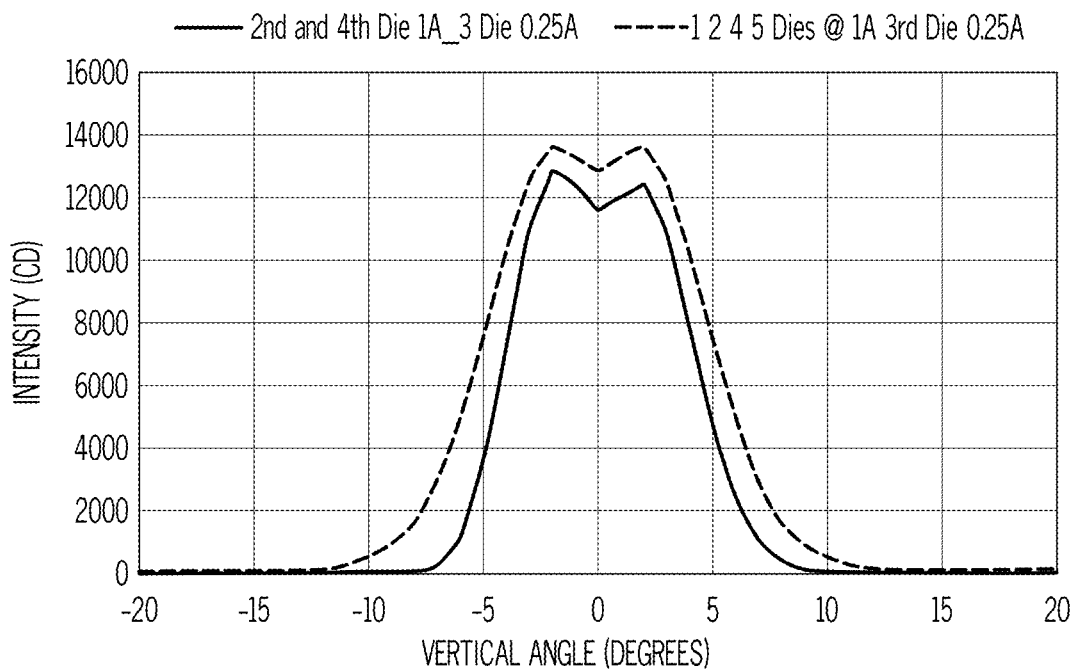

Further effects of varying the current supplied to various LEDs of the 5-die LED are shown in FIGS. 11A and 11B in conjunction with Table 3 shown below.

TABLE 3

| | Current | Beam Width (Degrees) @ 10% Horizontal | Vertical | Peak Intensity (cd) |
|---|---|---|---|---|
| 2nd and 4th Die | 1 A | 36.8° | 12.8° | 11,087 |
| Central die | 0.25 A | | | |
| 1st 2nd, 4th & 5th Die | 1 A | 53.5° | 17.1° | 11,166 |
| Central die | 0.25 A | | | |

As can be seen in FIGS. 11A and 11B and Table 3, changing the amount of current supplied to various LEDs of the 5-die LED alters the width and peak intensity of the overall emitted beam from the lighting device.

Figure 12:
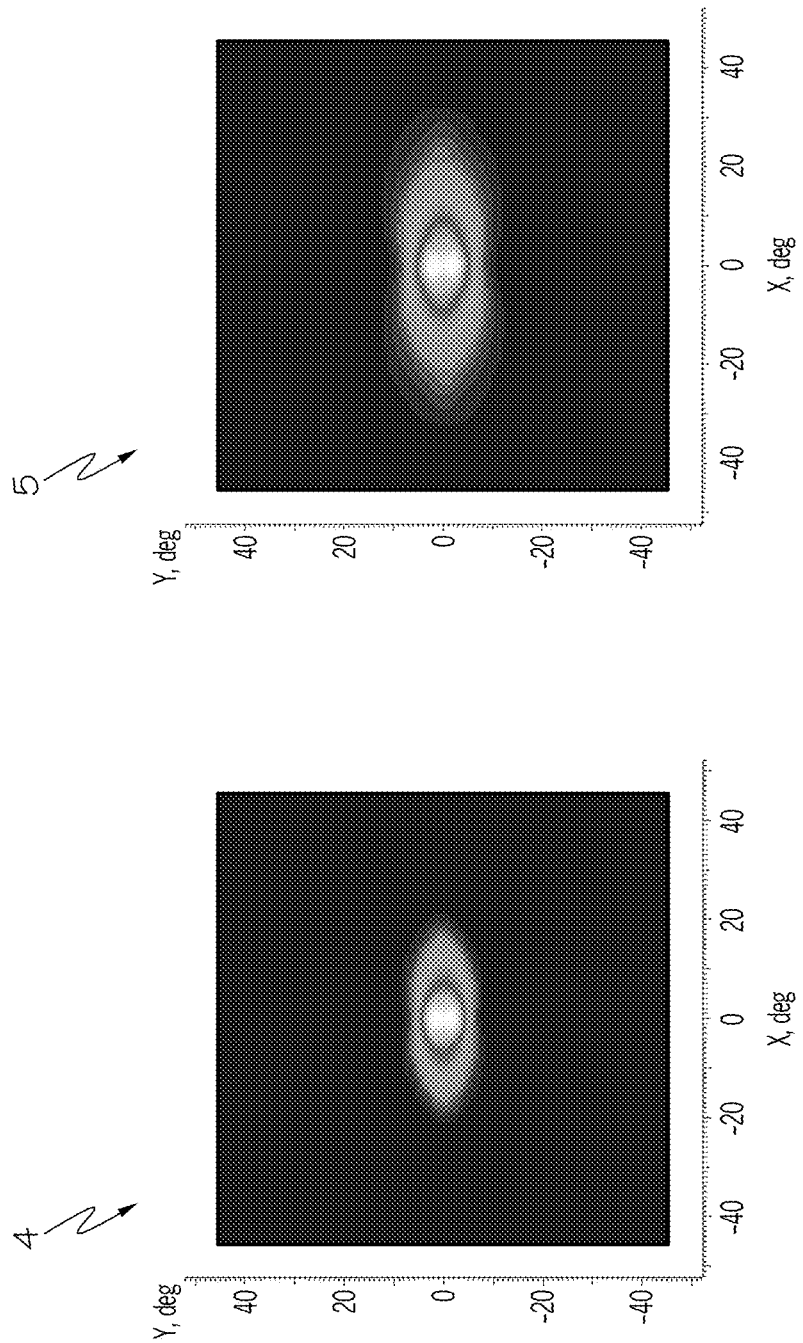
FIG. 12 shows images illustrating a variation in beam spread.

FIG. 12 shows intensity plots for the two situations given in Table 3. The left-most plot 4 of FIG. 12 shows the light intensity distribution of the overall beam from the lighting device when the central LED is supplied with 0.25 A of current and the $2^{nd}$ and $4^{th}$ LEDs are supplied with 1 A of current, and the right-most plot 5 of FIG. 12 shows the light intensity distribution of the overall beam from the lighting device when the central LED is supplied with 0.25 A of current and the remainder of the LEDs are supplied with 1 A of current. As can be seen in FIG. 12, as more LEDs of the 5-die LED are illuminated, the spread of the emitted composite beam increases and the peak intensity also increases.

As will be appreciated from the above explanation, varying the beam spread and peak intensity of the composite beam emitted from the lighting device without needed to move the light-emitting semiconductors relative to the optics negates the need for a movement mechanism, thereby reducing the possibility of mechanical failure and decreasing the cost of the overall lighting device.

Figure 13:
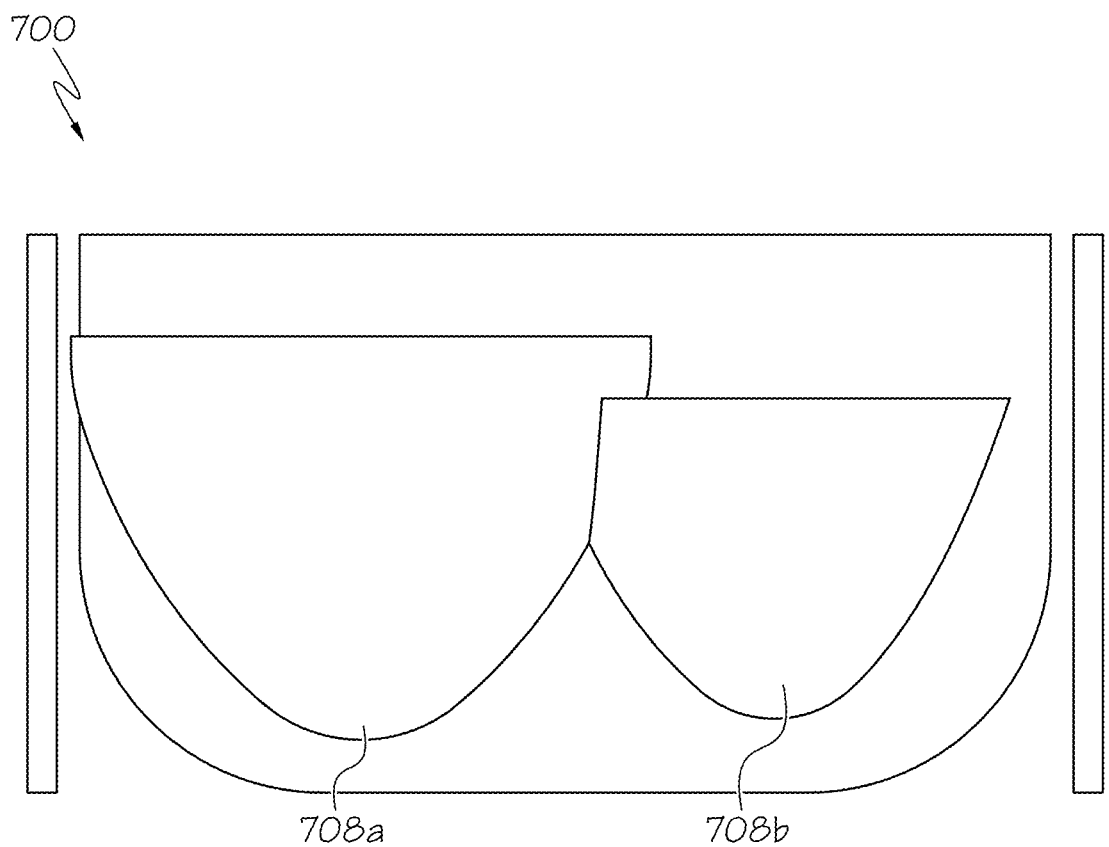
FIG. 13 shows a view of different types of reflectors used in a lighting device according to exemplary embodiments.

As explained above, the optical properties of the first and second subgroups of optics are different. A representation of different types of reflector having different optical properties that may be used as the different optics of the first and second subgroups of optics in a lighting device 700 is shown in FIG. 13. The reflectors 708a, 708b may be arranged in a manner of different ways so as to have different optical properties. One exemplary embodiment in which two different types of reflectors 708a, 708b are arranged proximate to one another is shown in FIG. 10. As can be seen in FIG. 13, the size and shape of the different types of reflectors 708a, 708b confer different optical properties. These different optical properties realize different optical effects, for example a different amount of beam spread of a beam of light reflected off the surface of each reflector.

In an exemplary embodiment, the reflectors 708a, 708b are parabolic reflectors, wherein the direction of peak intensity of emitted light from each light-emitting semiconductor device associated with each reflector is perpendicular to the axis of the parabola.

Figure 14:
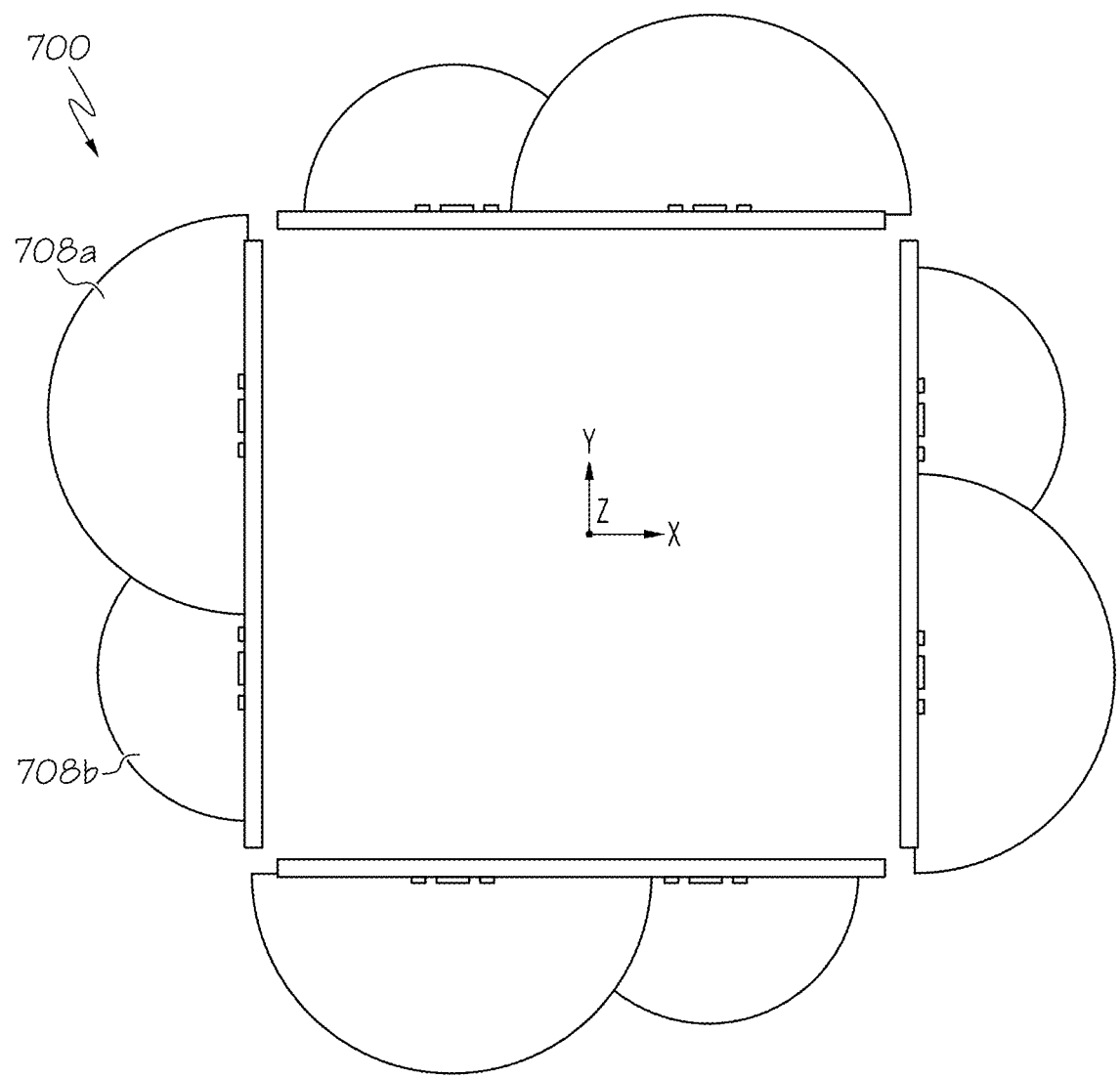
FIG. 14 shows a lighting device with the reflectors shown in FIG. 13.

FIG. 14 shows a top view of the lighting device 700 having two different types of reflectors 708a and 708b as the first and second subgroups of optics.

As explained above, at least two subgroups of optics are included in the lighting device of exemplary embodiments, with each subgroup of optics being associated with a respective subgroup of light-emitting semiconductor devices. In various exemplary embodiments, more than two subgroups of optics are included in the lighting device. In various exemplary embodiments each subgroup of optics comprises a different type of reflector. However, in other exemplary embodiments each subgroup of optics may comprise a lens with different optical properties. In yet other exemplary embodiments, the different subgroups of optics may correspond to a combination of lenses and reflectors, or still further optical devices.

The inclusion of three or four (or more) different subgroups of optics allows for an even greater variety of different beam spreads and patterns to be emitted by the lighting device as compared to a lighting device having two different subgroups of optics.

In order to still further increase the amount of different beam patterns and spreads which can be emitted by the lighting device, in various exemplary embodiments the different subgroups of light-emitting semiconductor devices also have different optical properties.

For example, one subgroup of light-emitting semiconductor devices may include square LEDs, such as CREE XHP35 LEDs. Another subgroup of light-emitting semiconductor devices may include rectangular LEDs, such as OSRAM Ostar LEDs. By varying the amount of electrical energy supplied to these different types of LEDs forming the different subgroups of light-emitting semiconductor devices, yet further different beam patterns and spreads may be achieved. The type and position of the light-emitting semiconductor devices may be selected based on the desired functionality of the lighting device.

In order to still further increase the variety of functions achievable by the lighting device, in exemplary embodiments certain subgroups of light-emitting semiconductor devices include infra-red (IR) LEDs. Incorporation of IR LEDs into certain subgroups of light-emitting semiconductor devices allows for dual-IR and visible light operation of the lighting device.

In exemplary embodiments, the lighting device is incorporated into a vehicle, for example an aircraft. For example, the lighting device may be incorporated into a dedicated fitting, such as a PAR fitting, of the vehicle. In an exemplary embodiment, the lighting device includes a connector configured to electrically connect components of the lighting device 100 to an external power supply (not shown) when the lighting device is fitted into the vehicle fitting. In another embodiment, the connector also provides for a physical connection between the lighting device and the vehicle fitting to fixedly secure the lighting device to the vehicle fitting as well as providing an electrical connection. In yet another embodiment, the connector may only provide a physical connection, and electrical energy is supplied to the lighting device components via a power source forming part of the lighting device.

Figure 15:
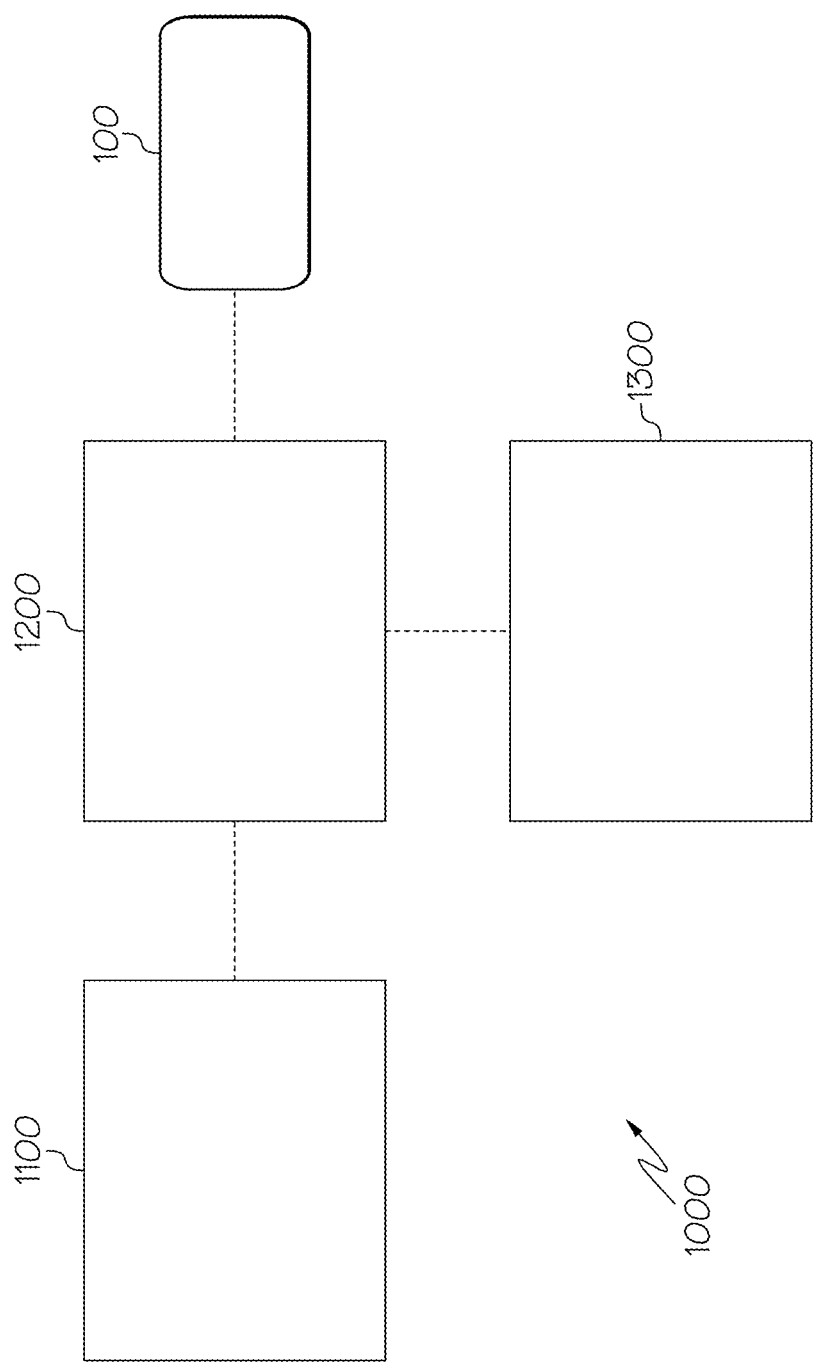
FIG. 15 shows a schematic of a vehicle including a lighting device in accordance with exemplary embodiments.

In exemplary embodiments, when the lighting device 100 is incorporated into a vehicle, the lighting device 100 is controllable by an occupant of the vehicle. FIG. 15 shows a schematic of a vehicle 1000 including a lighting device 100 in accordance with exemplary embodiments. The vehicle further includes a user interface module 1100, which comprises, for example a switch, dial, touchscreen or other input device. The vehicle further optionally includes a display module 1300. The user interface module 1100 and optional display module 1300 are operably connected to a processor 1200. The lighting device 100 is also operably connected to the processor 1200. In use, an occupant of the vehicle 1000 may interact with the user interface module 1100 so as to select a particular mode for the lighting device 100. For example, the occupant may interact with the user interface module so as to configure the lighting device 100 as a wide beam search light. In response to this input from the user interface module 1100, the processor 1200 is configured to transmit an instruction to the controller module of the lighting device so as to vary the currents supplied to the two or more subgroups of light-emitting semiconductor devices so as to modify the beam spread of the composite beam emitted by the lighting device to be around 40°×9°. The display module 1300 may display the current setting of the lighting device.

In another example, the occupant may interact with the user interface module so as to configure the lighting device 100 as a narrow beam search light. In response to this input from the user interface module 1100, the processor 1200 is configured to transmit an instruction to the controller module of the lighting device so as to vary the currents supplied to the two or more subgroups of light-emitting semiconductor devices so as to modify the beam spread of the composite beam emitted by the lighting device to be around 10°×10°. In this manner, the single lighting device 100 may be configured for different lighting functions.

As will be appreciated from the above explanation, multiple advantages are realized by the lighting device according to exemplary embodiments. One further advantage associated with the lighting device of exemplary embodiments, in addition to those presented above, is that a single lighting device may be manufactured and pre-configured for various different lighting applications. As such, the manufacturing process for manufacturing different lighting devices for different lighting applications may be simplified, since the required beam spreads and peak intensities for the different lighting applications can be obtained via supplying different currents to different subgroups of light-emitting semiconductor devices in the lighting device instead of changing the design of the lighting device for each particular application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A lighting device for a vehicle, the lighting device comprising:
   a plurality of light-emitting semiconductor devices, the plurality of light-emitting semiconductor devices being configured to together emit a beam of light having a beam width and a peak intensity, wherein the plurality of light-emitting semiconductor devices are separated into at least two subgroups;
   a plurality of optics, wherein the plurality of optics are separated into at least two subgroups, and wherein the plurality of optics are arranged relative to the plurality of light-emitting semiconductor devices such that each one of the plurality of light-emitting semiconductor devices of a first subgroup of the at least two subgroups is located at a focal point of a respective optic of a first subgroup of the plurality of optics, and such that each one of the plurality of light-emitting semiconductor devices of a second subgroup of the at least two subgroups is located at a focal point of a respective optic of a second subgroup of the plurality of optics, and wherein the optical properties of the first subgroup of the plurality of optics are different to the optical properties of the second subgroup of the plurality of optics; and
   a controller module configured to control at least two current signals supplied from a power source to each of the at least two subgroups of light-emitting semiconductor devices, respectively, wherein the controller module is configured to modify the beam width and the peak intensity of the emitted beam of light by varying the magnitude of the respective at least two current signals supplied to each of the at least two subgroups of light-emitting semiconductor devices.

2. The lighting device of claim 1, wherein the controller module is configured to
   control the at least two current signals between three or more discrete current values.

3. The lighting device of claim 1, wherein the plurality of optics comprises a plurality of lenses.

4. The lighting device of claim 3, wherein the plurality of lenses comprises a plurality of total internal reflection (TIR) lenses or a plurality of Fresnel lenses.

5. The lighting device of claim 1, wherein the plurality of optics comprises a plurality of reflectors.

6. The lighting device of claim 5, wherein the plurality of reflectors comprises a plurality of parabolic reflectors.

7. The lighting device of claim 6, wherein each one of the plurality of light-emitting semiconductor devices is positioned such that a peak emitted light intensity direction of each light-emitting semiconductor device is perpendicular to an axis of a respective parabolic reflector of the plurality of parabolic reflectors.

8. The lighting device of claim 1, wherein each subgroup of the at least two subgroups of light-emitting semiconductor devices comprise different combinations of LEDs from a multi-die LED.

9. A vehicle comprising a lighting device, the lighting device comprising:
   a plurality of light-emitting semiconductor devices, the plurality of light-emitting semiconductor devices being configured to together emit a beam of light having a beam width and a peak intensity, wherein the plurality of light-emitting semiconductor devices are separated into at least two subgroups;
   a plurality of optics, wherein the plurality of optics are separated into at least two subgroups, and wherein the plurality of optics are arranged relative to the plurality of light-emitting semiconductor devices such that each one of the plurality of light-emitting semiconductor devices of a first subgroup of the at least two subgroups is located at a focal point of a respective optic of a first subgroup of the plurality of optics, and such that each one of the plurality of light-emitting semiconductor devices of a second subgroup of the at least two subgroups is located at a focal point of a respective optic of a second subgroup of the plurality of optics, and wherein the optical properties of the first subgroup of the plurality of optics are different to the optical properties of the second subgroup of the plurality of optics; and
   a controller module configured to control at least two current signals supplied from a power source to each of the at least two subgroups of light-emitting semiconductor devices, respectively, wherein the controller module is configured to modify the beam width and the peak intensity of the emitted beam of light by varying the magnitude of the respective at least two current signals supplied to each of the at least two subgroups of light-emitting semiconductor devices.

10. The vehicle of claim 9, wherein the controller module is configured to control the at least two current signals between three or more discrete current values.

11. The vehicle of claim 9, wherein the plurality of optics comprises a plurality of lenses.

12. The vehicle of claim 11, wherein the plurality of lenses comprises a plurality of total internal reflection (TIR) lenses or a plurality of Fresnel lenses.

13. The vehicle of claim 9, wherein the plurality of optics comprises a plurality of reflectors.

14. The vehicle of claim 13, wherein the plurality of reflectors comprises a plurality of parabolic reflectors.

15. The vehicle of claim 14, wherein each one of the plurality of light-emitting semiconductor devices is positioned such that a peak emitted light intensity direction of each light-emitting semiconductor device is perpendicular to an axis of a respective parabolic reflector of the plurality of parabolic reflectors.

16. The vehicle of claim 9, wherein each subgroup of the at least two subgroups of light-emitting semiconductor devices comprise different combinations of LEDs from a multi-die LED.

17. The vehicle of claim 9, further comprising a user interface configured to receive an input from a user; and a processor configured to control the controller module to modify the beam width and the peak intensity of the emitted beam of light by varying the magnitude of the respective at least two current signals supplied to each of the at least two subgroups of light-emitting semiconductor devices on the basis of the user input.

18. The vehicle of claim 17, further comprising a display module to display information about the emitted beam of light.

19. A lighting device for a vehicle, the lighting device comprising:
   a plurality of light-emitting semiconductor devices, the plurality of light-emitting semiconductor devices comprising at least one multiple-LED die and being configured to together emit a beam of light having a beam width and a peak intensity, wherein the plurality of light-emitting semiconductor devices are separated into at least two subgroups;
   a plurality of optics, wherein each LED of the at least one multiple-LED die is associated with a respective parabolic reflector, each parabolic reflector being arranged relative to each LED of the at least one multiple-LED die such that the peak intensity of the beam of emitted light from each multiple-LED die is perpendicular to an axis of the respective parabolic reflector, and wherein each multiple-LED die is located at a focal point of each respective parabolic reflector; and
   a controller module configured to control at least two current signals supplied from a power source to each of the at least two subgroups of light-emitting semiconductor devices, respectively, wherein the controller module is configured to modify the beam width and the peak intensity of the emitted beam of light by varying the magnitude of the respective at least two current signals supplied to each of the at least two subgroups of light-emitting semiconductor devices.

20. The lighting device of claim 19, wherein the controller module is configured to control the at least two current signals between three or more discrete current values.

* * * * *